US009888299B2

(12) United States Patent  
Sato

(10) Patent No.: US 9,888,299 B2  
(45) Date of Patent: Feb. 6, 2018

(54) CONCENTRATOR

(71) Applicant: Kabushiki Kaisha Toshiba, Minato-ku, Tokyo (JP)

(72) Inventor: Koichi Sato, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/369,451

(22) Filed: Dec. 5, 2016

(65) Prior Publication Data

US 2017/0085969 A1   Mar. 23, 2017

Related U.S. Application Data

(63) Continuation of application No. PCT/JP2014/065118, filed on Jun. 6, 2014.

(51) Int. Cl.  
*H04Q 9/00* (2006.01)  
*G08C 15/00* (2006.01)  
(Continued)

(52) U.S. Cl.  
CPC ............... *H04Q 9/00* (2013.01); *G08C 15/00* (2013.01); *G08C 17/00* (2013.01); *H01Q 1/42* (2013.01);  
(Continued)

(58) Field of Classification Search  
CPC .. H04Q 9/00; H04Q 2209/40; H04Q 2209/60; G08C 15/00; G08C 17/00; H01Q 1/42; H04B 7/02  
(Continued)

(56) References Cited

U.S. PATENT DOCUMENTS 9,231,730 B2    1/2016  Yoshikawa et al.  
9,612,133 B2 *  4/2017  Wang ..................... G01D 4/002  
(Continued)

FOREIGN PATENT DOCUMENTS

CN   205862557       * 1/2017  
JP   H09-27092 A      1/1997  
(Continued)

OTHER PUBLICATIONS

International Search Report and Written Opinion (JP language only) mailed by Japan Patent Office dated Aug. 14, 2014 in the corresponding PCT application No. PCT/JP2014/065118—10 pages.  
(Continued)

*Primary Examiner* — Hirdepal Singh  
(74) *Attorney, Agent, or Firm* — Knobbe, Martens, Olson & Bear, LLP

(57) ABSTRACT

According to one embodiment, a concentrator, which has a first surface on which a measuring device, which measures an amount of electric power consumption, is arranged includes a housing, a communication module, a wireless communication module, a control module, a first antenna, and a second antenna. The housing includes a first sidewall and a second sidewall which are opposed in a first direction orthogonal to a direction of arrangement of the measuring device and the concentrator. The control module notifies a server of amounts of electric power consumption by using the wireless communication module. The first antenna is provided in proximity to the first sidewall. The second antenna is provided in proximity to the second sidewall.

20 Claims, 9 Drawing Sheets

(51) Int. Cl.
*G08C 17/00* (2006.01)
*H01Q 1/42* (2006.01)
*H04B 7/02* (2017.01)

(52) U.S. Cl.
CPC ........... *H04B 7/02* (2013.01); *H04Q 2209/40* (2013.01); *H04Q 2209/60* (2013.01)

(58) Field of Classification Search
USPC .................................................. 340/870.02
See application file for complete search history.

(56) References Cited

U.S. PATENT DOCUMENTS

| | | | | |
|---|---|---|---|---|
| 2009/0153357 | A1* | 6/2009 | Bushman | G01D 4/008 340/870.02 |
| 2010/0253538 | A1 | 10/2010 | Smith | |
| 2013/0042124 | A1* | 2/2013 | Isozaki | H04L 63/20 713/310 |
| 2013/0170530 | A1* | 7/2013 | Yoshikawa | H04B 7/0682 375/224 |
| 2014/0343744 | A1* | 11/2014 | Mansfield | H02J 3/14 700/297 |
| 2015/0276431 | A1* | 10/2015 | Ishida | G01D 4/002 340/870.02 |
| 2016/0093001 | A1* | 3/2016 | Dherbecourt | H04B 3/54 705/412 |
| 2016/0285588 | A1* | 9/2016 | Hald | H04Q 9/00 |
| 2017/0019809 | A1* | 1/2017 | Saikusa | H04L 67/325 |
| 2017/0104330 | A1* | 4/2017 | Nakaishi | H02J 3/14 |
| 2017/0153124 | A1* | 6/2017 | Li | G01D 4/002 |

FOREIGN PATENT DOCUMENTS

| | | |
|---|---|---|
| JP | H10-145126 A | 5/1998 |
| JP | 2002-374112 A | 12/2002 |
| JP | 2009-253788 A | 10/2009 |
| JP | 2011-081518 A | 4/2011 |
| JP | 2012-235261 A | 11/2012 |
| JP | 2013-021516 A | 1/2013 |
| JP | 2013-106335 A | 5/2013 |
| WO | WO 2012/042748 A1 | 4/2012 |

OTHER PUBLICATIONS

First Office Action dated Nov. 22, 2016 of Japanese Patent Application 2016-525655, 4 pages.

* cited by examiner

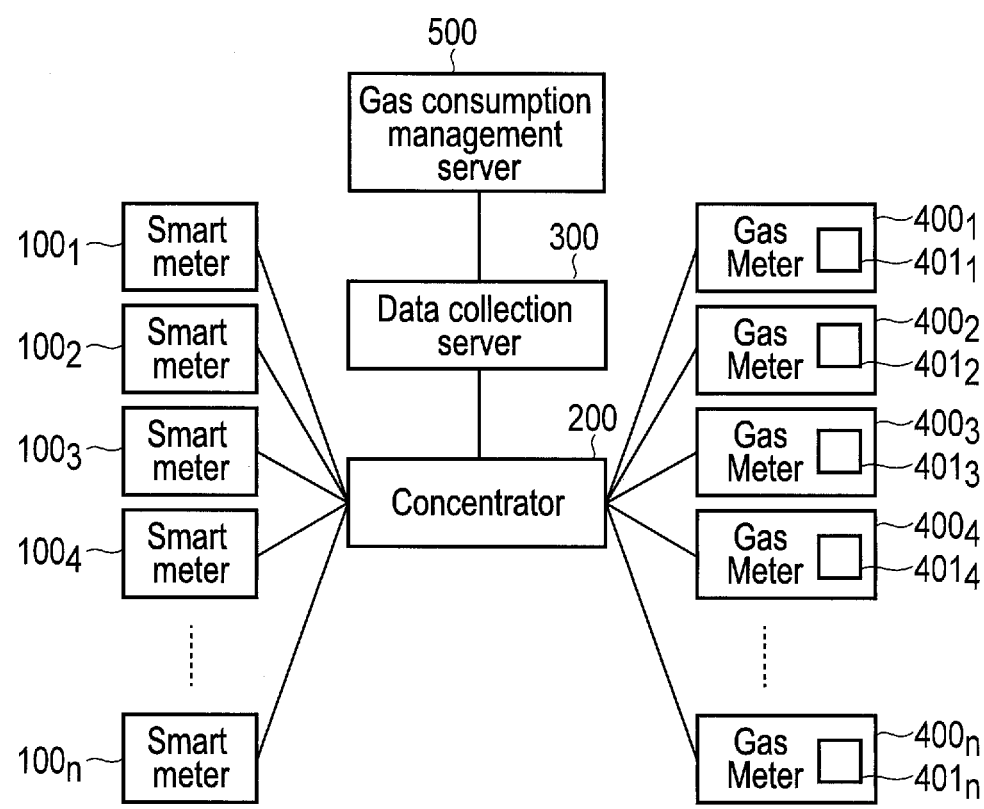
F I G. 1

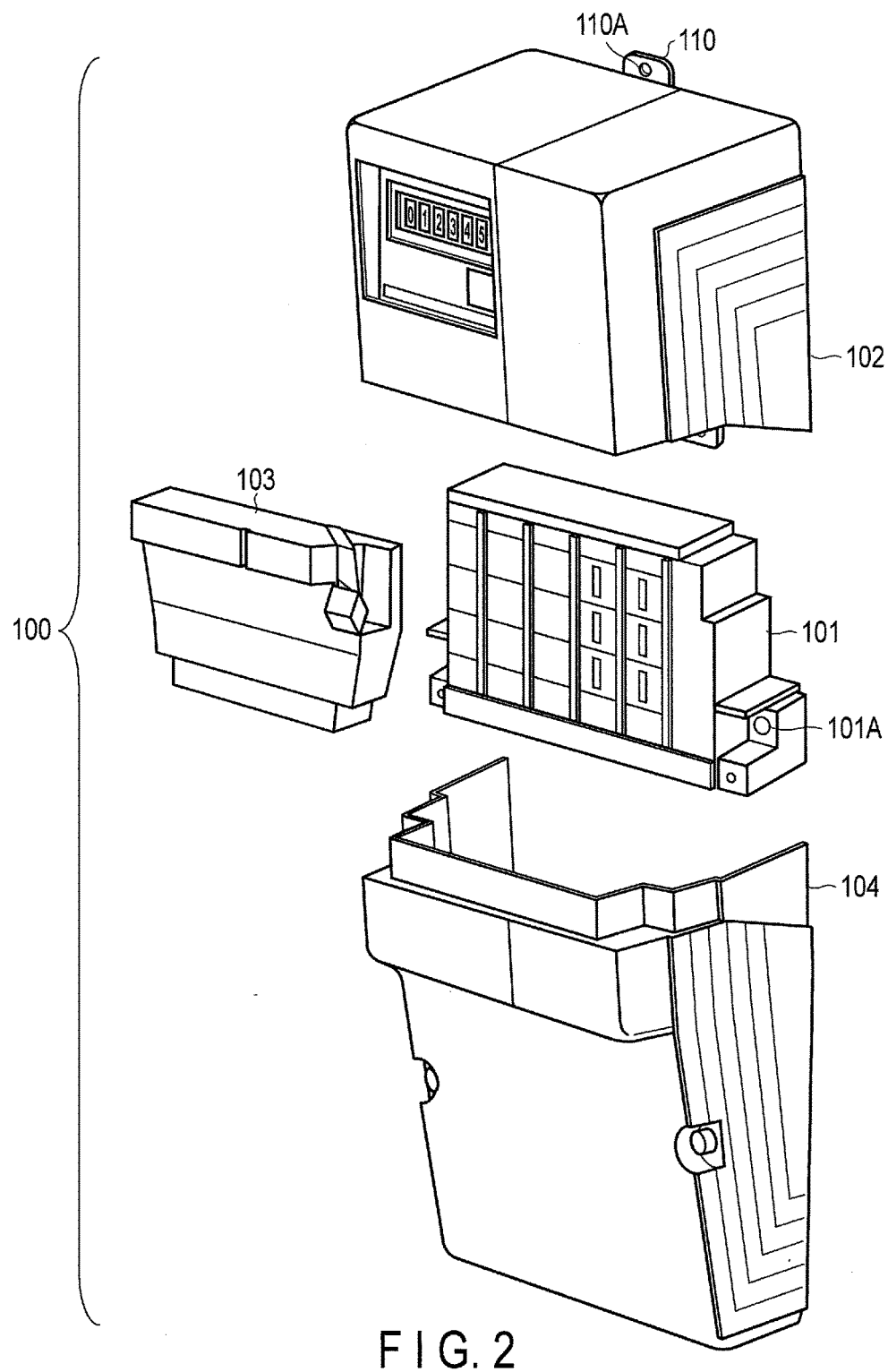
F I G. 2

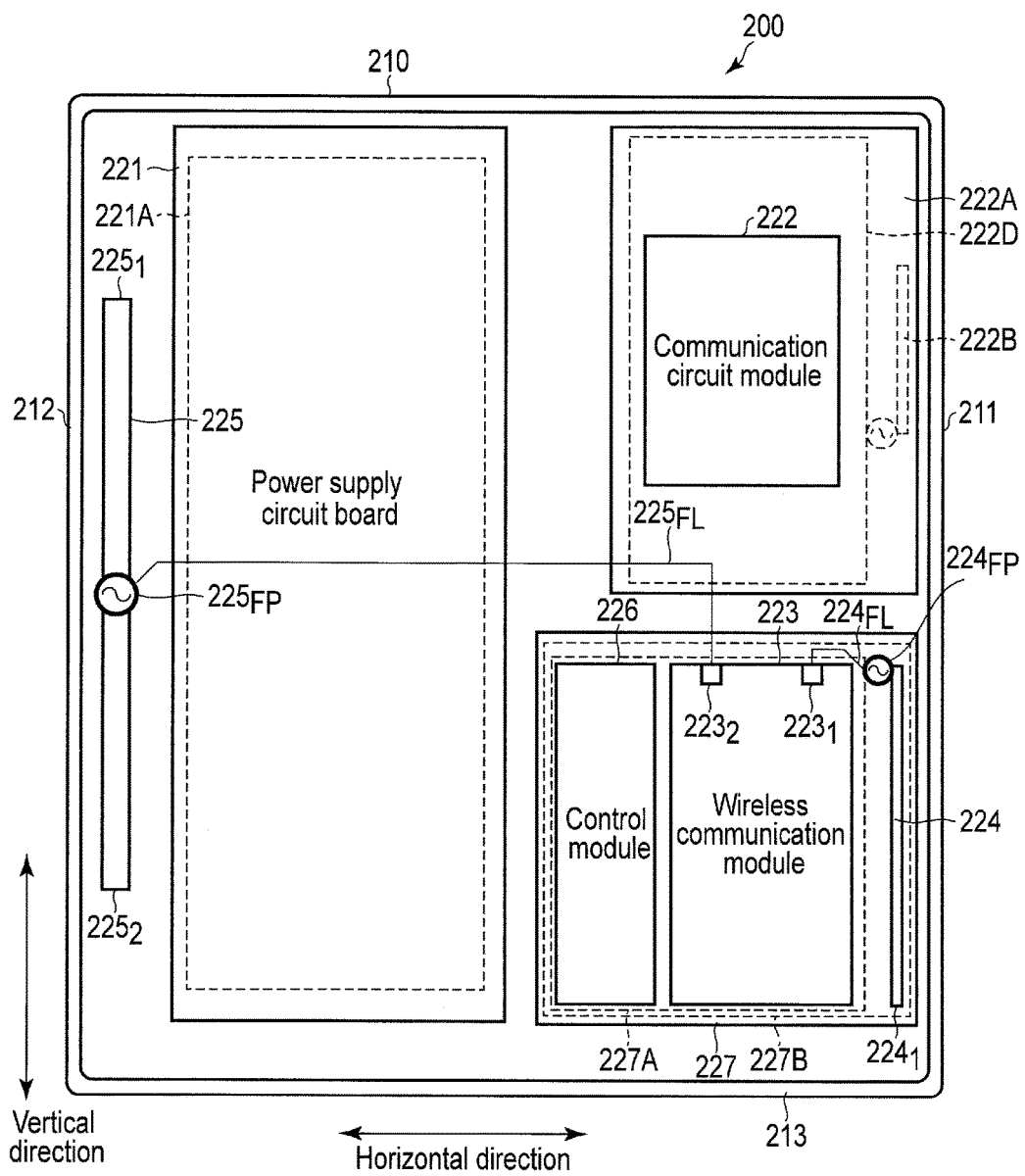
F I G. 4

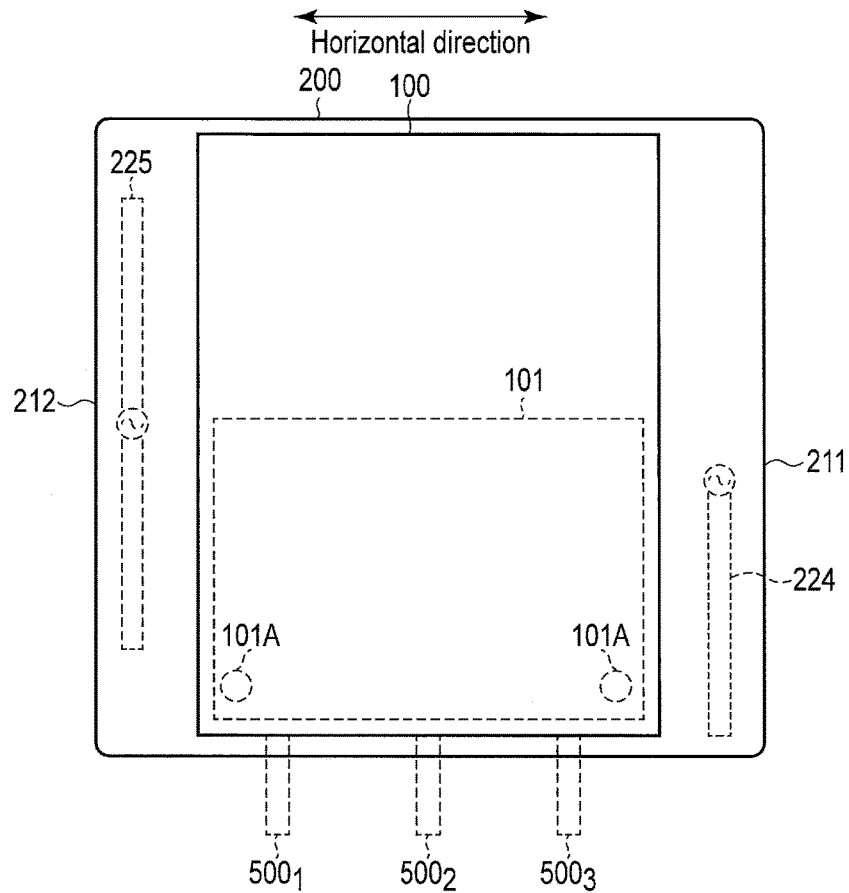
F I G. 5
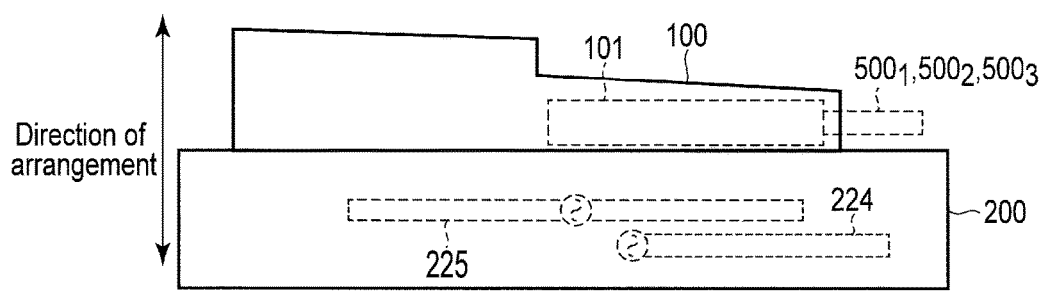
F I G. 6

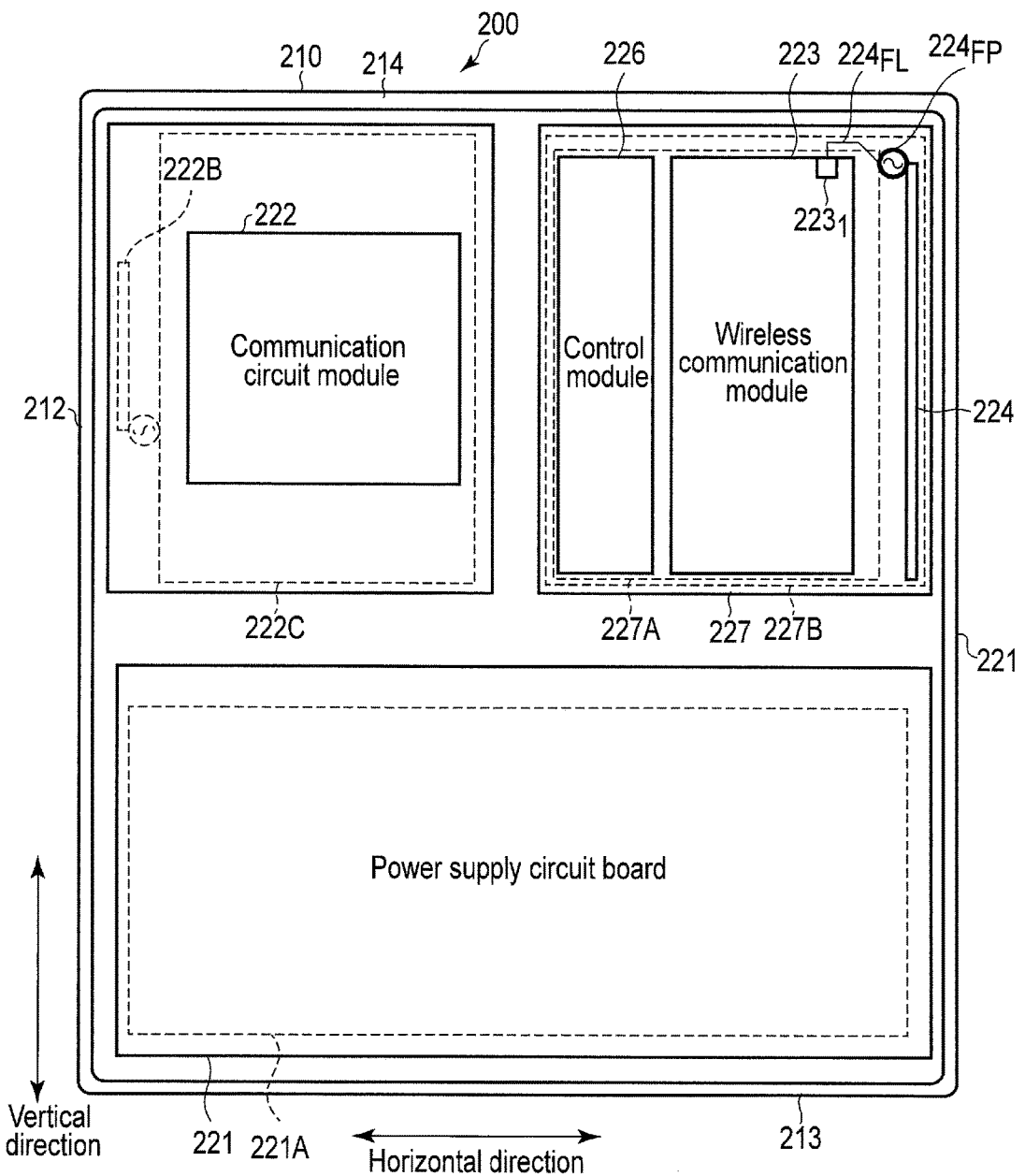
F I G. 8

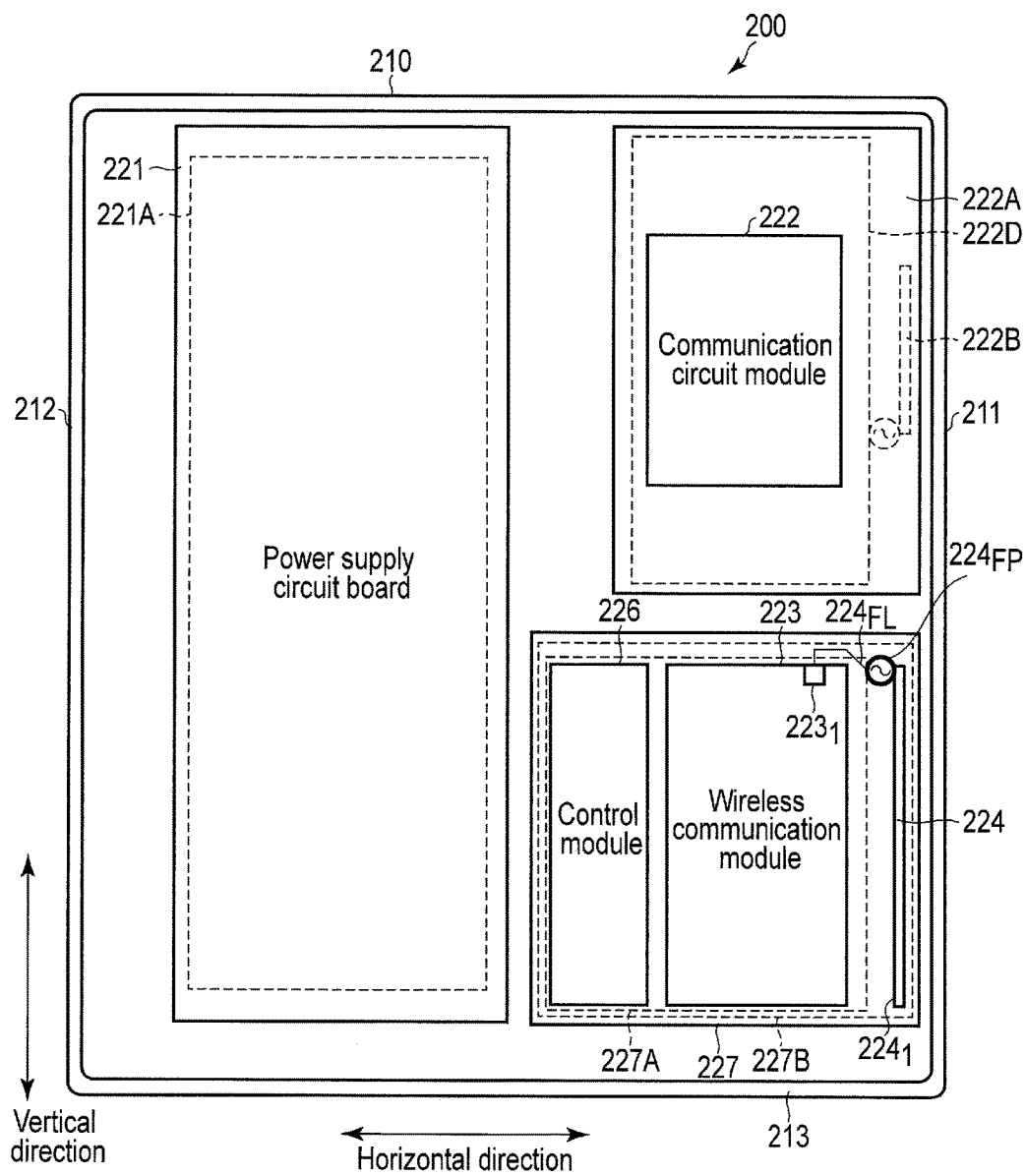
F I G. 10

CONCENTRATOR

CROSS REFERENCE TO RELATED APPLICATIONS

This application is a Continuation Application of PCT Application No. PCT/JP2014/065118, filed Jun. 6, 2014, the entire contents of which are incorporated herein by reference.

FIELD

Embodiments described herein relate generally to a concentrator.

BACKGROUND

An electric power meter having a communication function to measure an amount of electric power consumption digitally and notify a power company of the measured amount of electric power consumption by using a communication line (a so-called smart meter) is about to be introduced.

The smart meter notifies a concentrator of the measured amount of electric power consumption. The concentrator is notified of amounts of electric power consumption by several hundred smart meters. The concentrator notifies the power company of the amount of electric power consumption measured by each smart meter.

The concentrator notifies a server of the amount of electric power consumption of each household by, for example, a wireless communication of a cellular scheme. In some cases, the concentrator is provided on the back surface of the smart meter. Since the smart meter has metal components such as a transformer, degradation in antenna performance is expected.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram showing a configuration of a smart meter system according to an embodiment.

FIG. 2 is an exemplary exploded perspective view showing a configuration of a smart meter of the embodiment.

FIG. 4 is an exemplary diagram showing a configuration of the concentrator of the embodiment.

FIG. 5 is a front view of the smart meter and the concentrator.

FIG. 6 is a side view of the smart meter and the concentrator.

FIG. 8 is an exemplary diagram showing another example of the configuration of the concentrator.

FIG. 10 is an exemplary diagram showing yet another example of the configuration of the concentrator.

DETAILED DESCRIPTION

Figure 3:
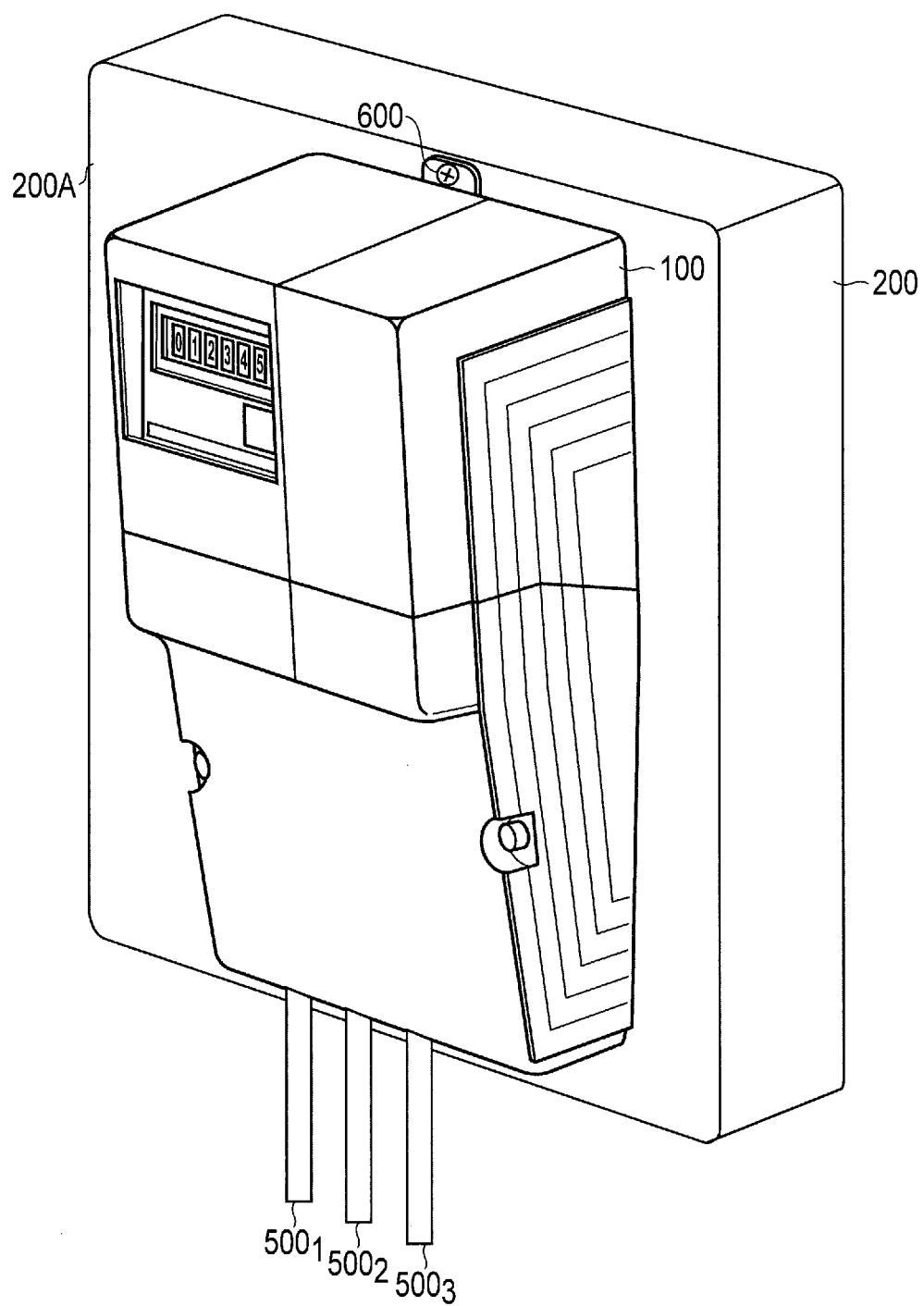
FIG. 3 is an exemplary perspective view showing an appearance of the smart meter and a concentrator of the embodiment.

Various embodiments will be described hereinafter with reference to the accompanying drawings.

In general, according to one embodiment, a concentrator having a first surface on which a measuring device, which measures an amount of electric power consumption, is arranged includes a housing, a communication module, a wireless communication module, a control module, a first antenna, and a second antenna. The housing includes a first sidewall and a second sidewall which are opposed in a first direction orthogonal to a direction of arrangement of the measuring device and the concentrator, the first sidewall and the second sidewall being connected to the first surface. The communication module is provided in the housing and is configured to receive amounts of electric power consumption from measuring devices including the measuring device. The wireless communication module is provided in the housing. The control module is configured to notify a server of the amounts of electric power consumption by using the wireless communication module. The first antenna is provided in proximity to the first sidewall. The second antenna is provided in proximity to the second sidewall.

FIG. 1 shows a configuration of a smart meter system.

Smart meters (measuring devices) $100_1$, $100_2$, $100_3$, ..., $100_n$ provided in electric power consuming spots such as homes measure amounts of electric power consumption of respective electric power consuming spots. Each of the smart meters $100_1$, $100_2$, $100_3$, ..., $100_n$ notifies a concentrator 200 of an amount of half-hour electric power consumption. The concentrator 200 notifies a data collection server 300 of the amounts of electric power consumption. The data collection server 300 analyzes the amounts of electric power consumption, thereby providing services to set electric power charge or to facilitate efficient energy use.

The smart meter system may be used by a gas meter system. In this case, wireless communication devices $401_1$, $401_2$, $401_3$, ..., $401_n$ are provided in gas meters $400_1$, $400_2$, $400_3$, ..., $400_n$ which measure amounts of gas consumption. The wireless communication devices $401_1$, $401_2$, $401_3$, ..., $401_n$ transmit the measured amounts of gas consumption (meter reading data) to the concentrator 200. The gas meters $400_1$, $400_2$, $400_3$, ..., $400_n$ or wireless communication devices $401_1$, $401_2$, $401_3$, ..., $401_n$ should preferably encrypt gas consumption data. The concentrator 200 transmits the amounts of gas and electric power consumption to the data collection server 300. The data collection server 300 extracts gas consumption data from the acquired amounts of gas and electric power consumption, and transmits the extracted data to a gas consumption management server 500 used by a gas company. If the gas consumption data is encrypted, the encrypted data is decrypted in the gas consumption management server 500 or a client device which accesses the gas consumption management server 500.

FIG. 2 shows a configuration of a smart meter.

As shown in FIG. 2, a smart meter 100 includes a terminal unit 101, a meter 102, a communication unit 103 and a terminal cover 104.

A power line is connected to the terminal unit 101. The meter 102 measures an amount of electric power consumption in an electric power consuming spot. The communication unit 103 notifies the concentrator 200 of the measured amount of electric power consumption, for example, every half hour. The communication unit 103 notifies the concentrator 200 of the amount of electric power consumption by, for example, a power line communications (PLC) scheme or a wireless multi-hop scheme (Wi-SUN, ZigBee [Registered Trademark] or the like).

The meter 102 is equipped with an engagement member 110. The engagement member 110 is equipped with a screw hole 110A for fixing the smart meter 100 to a concentrator.

The terminal unit 101 is equipped with a screw hole 101A through which a screw for fixing the smart meter 100 to the concentrator penetrates.

The terminal cover 104 covers the terminal unit 101 to prevent the terminal unit 101 from being exposed.

For example, the smart meter in one out of five hundred electric power consuming spots is provided on the concentrator.

FIG. 3 shows an appearance of the smart meter 100 and the concentrator 200.

As shown in FIG. 3, the smart meter 100 is provided on a first surface (for example, an upper surface 200A) of the concentrator 200. Power lines of three-wire system $500_1$, $500_2$, and $500_3$ are connected to the smart meter 100.

The smart meter 100 is fixed to the concentrator 200 by a screw 600 and other fixing members such that the central region of the concentrator 200 in the horizontal direction corresponds to the central region of the smart meter 100, and the upper end of the smart meter 100 is close to the upper end of the concentrator 200. A smart meter different in size from the smart meter 100 may be attached to the concentrator 200. In this case, too, the smart meter is fixed such that the central region of the concentrator 200 in the horizontal direction corresponds to the central region of the smart meter, and the upper end of the smart meter is close to the upper end of the concentrator 200.

The concentrator 200 communicates with the data collection server 300 and the like through a base station by a communication of a cellular scheme. When the concentrator 200 overlaps the smart meter 100 as shown in FIG. 3, degradation in performance of an antenna provided in the concentrator 200 is expected because the smart meter 100 has a number of metal components such as a transformer. The metal terminal unit 101 also constitutes a major cause of the degradation in antenna performance.

FIG. 4 shows a configuration of the concentrator 200.

The concentrator 200 includes a housing 210. The housing 210 is formed of resin. The housing 210 includes a first sidewall 211 and a second sidewall 212 which are opposed in a direction orthogonal to the direction of arrangement of the smart meter 100 and the concentrator 200, for example, in the horizontal direction. The first sidewall 211 and the second sidewall 212 are connected to the first surface 200A.

A power supply circuit board 221, a communication module (communication circuit module) 222, a wireless communication module 223, a first antenna 224, a second antenna 225, a control module 226 and the like are provided in the housing 210.

The power supply circuit board 221 includes a circuit area 221A for generating electric power for driving the communication module 222, the wireless communication module 223 and the control module 226. The power supply circuit board 221 is provided on a side closer to the second sidewall 212 than the first sidewall 211 in the housing 210.

The communication module 222 communicates with a smart meter provided in each electric power consuming spot. The communication module 222 communicates with the smart meter by, for example, a power line communication (PLC) scheme or a wireless multi-hop scheme (Wi-SUN, ZigBee or the like). If the communication module 222 is configured to communicate wirelessly with the smart meter 100, an antenna (third antenna) 222B for the communication module 222 is further provided in the concentrator 200. The range of the wireless communication is narrower than that of the communication of the cellular scheme. The communication module 222 is provided on a communication board 222A. The antenna 222B is a monopole-type antenna using a ground layer 222D of the communication board 222A as a conductive plane of the antenna.

The wireless communication module 223 communicates wirelessly with the data collection server 300. The wireless communication module 223 communicates wirelessly by the cellular scheme. The first antenna 224 and second antenna 225 are connected to the wireless communication module 223. The first antenna 224 is fixed in proximity to the first sidewall 211. The longitudinal direction of the first antenna 224 corresponds to a direction extending along the first sidewall 211. The second antenna 225 is fixed in proximity to the second sidewall 212. The second antenna 225 is provided closer to the second sidewall 212 than the circuit area 221A of the power supply circuit board 221. The longitudinal direction of the second antenna 225 corresponds to a direction extending along the second sidewall 212.

The first antenna 224 is provided closer to the first sidewall 211 than an electronic circuit area 227A of a control board 227 in which an electronic circuit including the wireless communication module 223, the control module 226 and the like is located. In other words, the first antenna 224 is provided between the first sidewall 211 and the electronic circuit area 227A. The control board 227 is provided on a side closer to the first sidewall 211 than the second sidewall 212 in the housing 210. The control board 227 and the communication board 222A are arranged in a direction orthogonal to a third sidewall 213 connected to the first sidewall 211 and the second sidewall 212. That is, the control board 227 and the communication board 222A are arranged in the vertical direction. The control board 227 and the power supply circuit board 221 are arranged in a direction orthogonal to the second sidewall 212. In other words, the control board 227 and the power supply circuit board 221 are arranged in the horizontal direction.

The length in the direction parallel to the second sidewall 212 of the power supply circuit board 221 is greater than that of each of the control board 227 and the communication module 222 (communication board 222A).

The first antenna 224 and the control module 226 are mounted on the same control board 227. A diversity antenna is constituted by the first antenna 224 and the second antenna 225. The first antenna 224 is a monopole-type antenna using a ground layer 227B of the control board 227 as a conductive plane of the antenna. The second antenna 225 is a dipole-type antenna.

The conductive plane is not necessarily provided on the control board 227. For example, a ground layer provided on a board other than the control board 227 or a metal plate other than the control board 227 may be used as the conductive plane. The first antenna 224 may be provided on a housing 210 of the concentrator 200, not on the control board 227. That is, the first antenna 224 may be provided, for example, on a sidewall surface of the first sidewall 211.

The second antenna 225 is provided in proximity to the second sidewall 212 and is closer to the second sidewall 212 than the power supply circuit board 221. In other words, the second antenna 225 is provided between the second sidewall 212 and the power supply circuit board 221. The power supply circuit board 221 includes a board and various electronic components and electronic circuits provided on the board. The second antenna 225 is provided closer to the second sidewall 212 than an electronic circuit area 221A of the power supply circuit board 221. In other words, the second antenna 225 is provided between the second sidewall 212 and the electronic circuit area 221A of the power supply circuit board 221. The second antenna 225 may be provided on the second sidewall 212. The second antenna 225 is provided outside the power supply circuit board 221 in FIG. 4, but may be provided on the power supply circuit board 221.

The wireless communication module 223 is equipped with two antenna ports $223_1$ and $223_2$ to which two feed lines are connected. The first antenna 224 is connected to the antenna port $223_1$ through a feed line $224_{FL}$. The second antenna 225 is connected to the antenna port $223_2$ through a feed line $225_{FL}$.

The first antenna 224 extends downward at the time of installation (hereinafter referred to as downward) from a feed point $224_{FP}$ in a direction orthogonal to the horizontal direction (i.e., the vertical direction at the time of installation). In other words, the first antenna 224 extends from the feed point $224_{FP}$ parallel to the first sidewall 211 in the opposite direction of the communication module 222. The first antenna 224 may extend from the feed point $224_{FP}$ in the opposite direction of FIG. 4 on the control board 227.

An open end $224_1$ of the first antenna 224 is directed downward in FIG. 4, but may be directed upward on the plane of the drawing. In other words, the first antenna 224 may be bent. The second antenna 225 extends from a feed point $225_{FP}$ in the direction orthogonal to the horizontal direction (i.e., the vertical direction at the time of installation). In other words, the second antenna 225 extends parallel to the second sidewall 212. One open end $225_1$ of the second antenna 225 is directed upward and the other open end $225_2$ of the second antenna 225 is directed downward at the time of installation in an installation position. However, an element of the second antenna 225 may be bent such that the open ends $225_1$ and $225_2$ of the second antenna 225 are directed to the same direction (upward or downward).

The control module 226 acquires an amount of electric power consumption from a smart meter 100 in each installation spot by using the communication module 222. The control module 226 notifies the data collection server 300 of the acquired amounts of electric power consumption.

Since the first antenna 224 is located in proximity to the first sidewall 211 and the second antenna 225 is located in proximity to the second sidewall 212, the first antenna 224 and the second antenna 225 are insulated from the influence of metal components provided in the smart meter 100. As a result, degradation in performance of the first antenna 224 and the second antenna 225 can be prevented.

FIG. 5 is a front view of the smart meter 100 and the concentrator 200. When viewing the smart meter 100 and the concentrator 200 from the front as shown in FIG. 5, the antennas 224 and 225 are provided in positions that are deviated from the terminal unit 101 and the power lines $500_1$, $500_2$, and $500_3$.

FIG. 6 is a side view of the smart meter 100 and the concentrator 200. When viewing the smart meter 100 and the concentrator 200 from the side as shown in FIG. 6, the antennas 224 and 225 are provided in positions that are deviated from the terminal unit 101 and the power lines $500_1$, $500_2$, and $500_3$.

The length in the horizontal direction of the housing 210 of the concentrator 200 is greater than that of the smart meter 100 in FIG. 5, but may be equal to that of the smart meter 100. In the case where the length in the horizontal direction of the housing 210 is greater than that of the smart meter 100 as in FIG. 5, screw holes provided on a lid of the housing 210 of the concentrator 200 (i.e., screw holes overlapping the screw holes 101A) are located inside the first and second antennas 224 and 225. In other words, a screw hole 101A located near the first sidewall 211 is provided on the second sidewall 212 side with reference to the first antenna 224, and a screw hole 101A located near the second sidewall 212 is provided on the first sidewall 212 side with reference to the second antenna 225. In the case where the length in the horizontal direction of the housing 210 is nearly equal to that of the smart meter 100, the screw holes provided on the lid of the housing 210 of the concentrator 200 are located near the first and second antennas 224 and 225.

The first antenna 224 and the second antenna 225 should preferably be located so as not to overlap the smart meter 100 in the direction of arrangement of the smart meter 100 and the concentrator 200. However, high wireless performance can be maintained even if the first antenna 224 and the second antenna 225 overlap the smart meter 100 because these antennas 224 and 225 are located near resin sidewalls 211 and 212.

Since the monopole-type first antenna 224 and the dipole-type second antenna 225 are different in radiation pattern from each other, a correlation between the antennas can be reduced. As a result, the diversity effect can be improved.

Figure 7:
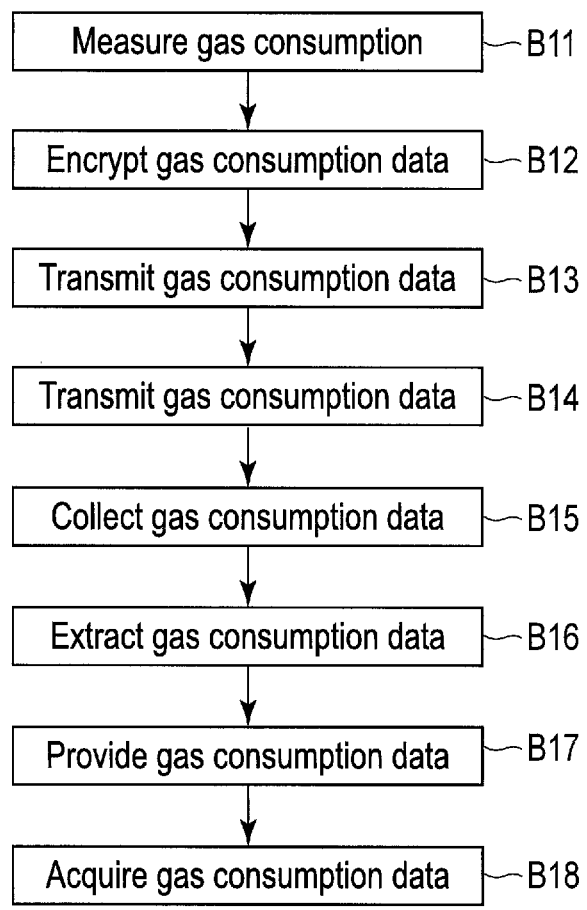
FIG. 7 is an exemplary flowchart showing the procedure of a collecting process of gas consumption data.

Next, the procedure of a collecting process of gas consumption data is described with reference to a flowchart of FIG. 7. In the following method, the concentrator 200 may notify the data collection server 300 of electric power consumption data without using the communication of cellular scheme.

First, each of the gas meters $400_1$, $400_2$, $400_3$, . . . , $400_n$ measures an amount of gas consumption (block B11). Each of the gas meters $400_1$, $400_2$, $400_3$, . . . , $400_n$ encrypts gas consumption data obtained by the measurement (block B12). Each of the gas meters $400_1$, $400_2$, $400_3$, . . . , $400_n$ transmits the encrypted gas consumption data to the concentrator 200 by using the wireless communication device $401_1$, $401_2$, $401_3$, . . . $401_n$ (block B13). The concentrator 200 transmits the encrypted gas consumption data transmitted from each of the gas meters $400_1$, $400_2$, $400_3$, . . . , $400_n$ to the data collection server 300 (block B14). The data collection server 300 collects the gas consumption data (block B15). The data collection server 300 extracts gas consumption data from the collected data (including electric power consumption data) (block B16). The data collection server 300 transmits the extracted gas consumption data to the gas consumption management server 500, thereby supplying the gas consumption management server 500 with the gas consumption data in each installation spot (block B17). The gas consumption management server 500 acquires the gas consumption data by receiving the supplied gas consumption data (block B18).

FIG. 8 shows a modified configuration example of the concentrator 200. As shown in FIG. 8, the concentrator 200 does not include a dipole-type antenna. The power supply circuit board 221 is provided closer to a third sidewall 213 than a fourth sidewall 214. The third sidewall 213 and the fourth sidewall 214 are opposed to each other in the vertical direction. The third sidewall 213 is located on the lower side at the time of installation. The communication module 222 (communication board 222A) and the control board 227 are located closer to the fourth sidewall 214 than the third sidewall 213. The fourth sidewall 214 is located on the upper side at the time of installation. The communication module 222 (communication board 222A) and the control board 227 are aligned in the horizontal direction. The first antenna 224 is located in proximity to the first sidewall 211. The antenna 222B is located in proximity to the second sidewall 212.

Figure 9:
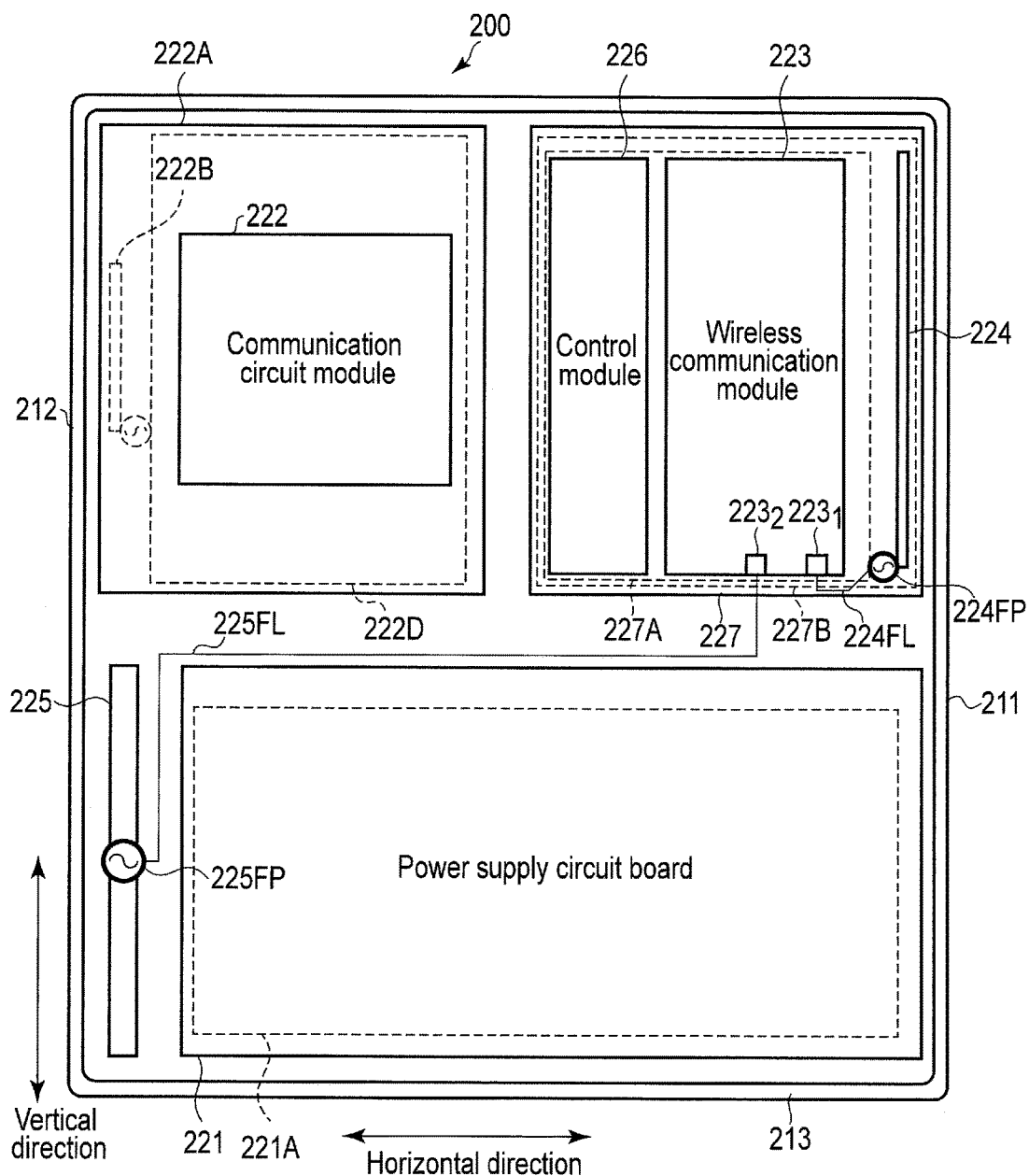
FIG. 9 is an exemplary diagram showing yet another example of the configuration of the concentrator.

FIG. 9 shows another modified configuration example of the concentrator 200. As shown in FIG. 9, a layout of the power supply circuit board 221, the communication module 222 (communication board 222A) and the control board 227 is the same as that of the concentrator of FIG. 8. The concentrator 200 includes a dipole-type second antenna 225.

FIG. 10 shows yet another configuration example modified example of the concentrator 200. As shown in FIG. 10, a dipole-type second antenna is not provided. A layout of the power supply circuit board 221, the communication module 222 (communication board 222A) and the control board 227 is the same as that of the concentrator 200 of FIG. 4. Since the first antenna 224 is located in proximity to the first sidewall 211, the first antenna 224 is insulated from the influence of metal components provided in the smart meter 100. Therefore, degradation in antenna performance can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A concentrator comprising a first surface on which a measuring device configured to measure an amount of electric power consumption, is arranged, the concentrator comprising:
a housing comprising a first sidewall and a second sidewall opposing each other in a first direction orthogonal to a direction of arrangement of the measuring device and the concentrator, the first sidewall and the second sidewall connected to the first surface;
a communication controller provided in the housing and configured to receive amounts of electric power consumption from measuring devices including the measuring device;
a wireless communication controller provided in the housing;
a controller configured to notify a server of the amounts of electric power consumption by using the wireless communication controller;
a first antenna provided in proximity to the first sidewall; and
a second antenna provided in proximity to the second sidewall.

2. The concentrator of claim 1, wherein
the first and second antennas are connected to the wireless communication controller.

3. The concentrator of claim 1, wherein
the communication controller is configured to receive the amounts of electric power consumption from the measuring devices by wireless communication,
one of the first and second antennas is connected to the wireless communication controller, and the other of the first and second antennas is connected to the communication controller.

4. The concentrator of claims 2, wherein
the first antenna is a monopole antenna.

5. The concentrator of claim 1, wherein
the second antenna is a dipole antenna.

6. The concentrator of claim 1, wherein
the first antenna is arranged such that a longitudinal direction of the first antenna corresponds to a direction extending along the first sidewall.

7. The concentrator of claim 1, wherein
the second antenna is arranged such that a longitudinal direction of the second antenna corresponds to a direction extending along the second sidewall.

8. The concentrator of claims 1, further comprising a control board provided closer to the first sidewall than the second sidewall and comprising an electronic circuit comprising the wireless communication controller,
wherein the first antenna is provided closer to the first sidewall than an area in which the electronic circuit is provided.

9. The concentrator of claim 8, wherein
the first antenna is provided on the control board.

10. The concentrator of claim 8, further comprising a power supply circuit board provided closer to the second sidewall than the first sidewall,
wherein the second antenna is provided closer to the second sidewall than a circuit area of the power supply circuit board.

11. The concentrator of claim 8, further comprising a communication board on which the communication module is provided,
wherein the control board and the communication board are arranged in a direction orthogonal to a third sidewall connected to the first sidewall and the second sidewall.

12. The concentrator of claim 11, wherein
the communication controller is a wireless communication controller and further comprises a third antenna provided on or in proximity to the communication board for the wireless communication controller.

13. The concentrator of claim 12, wherein
the third antenna is provided in proximity to the first sidewall or the second sidewall.

14. The concentrator of claim 10, further comprising a communication board on which the communication controller is provided,
wherein the control board and the power supply circuit board are arranged in a direction orthogonal to the second sidewall.

15. The concentrator of claim 14, wherein
a length of the power supply circuit board in a direction orthogonal to a third sidewall connected to the first sidewall and the second sidewall is greater than a length of the control board in the direction orthogonal to the third sidewall and a length of the communication board in the direction orthogonal to the third sidewall.

16. The concentrator of claim 1, wherein
a length of the housing in the first direction is greater than a length of the measuring device in the first direction.

17. The concentrator of claim 16, wherein
the first antenna or the second antenna is located so as not to overlap the measuring device in the direction of arrangement.

18. The concentrator of claim 1, wherein
the measuring device provided on the concentrator is a meter which records an amount of electric power consumption wirelessly and has a communication function of communicating with the concentrator.

19. A concentrator comprising a first surface comprising a measuring device configured to measure an amount of electric power consumption, is arranged, the concentrator comprising:
- a housing comprising a first sidewall and a second sidewall opposing each other in a first direction orthogonal to a direction of arrangement of the measuring device and the concentrator, the first sidewall and the second sidewall connected to the first surface;
- a communication controller provided in the housing and configured to receive amounts of electric power consumption from measuring devices including the measuring device;
- a wireless communication controller provided in the housing;
- a controller configured to notify a server of the amounts of electric power consumption by using the wireless communication controller; and
- a first antenna and a second antenna provided in proximity to the first sidewall.

20. A data acquisition method in a data acquisition system, the data acquisition system comprising: a gas meter comprising a wireless communication device; a concentrator having a first surface on which a measuring device, which measures an amount of electric power consumption, is arranged, the concentrator comprising a housing comprising a first sidewall and a second sidewall which are opposed in a first direction orthogonal to a direction of arrangement of the measuring device and the concentrator, the first sidewall and the second sidewall being connected to the first surface, a length of the housing in the first direction being greater than a length of the measuring device in the first direction, a communication controller provided in the housing and configured to receive amounts of electric power consumption from measuring devices including the measuring device, a wireless communication controller provided in the housing, a controller configured to notify a server of the amounts of electric power consumption by using the wireless communication controller; a first antenna provided in proximity to the first sidewall and connected to the wireless communication controller, and a second antenna provided in proximity to the second sidewall and connected to the wireless communication controller; a first collection server configured to collect electric power consumption data and gas consumption data transmitted from the concentrator and to extract the gas consumption data; and a second collection server configured to receive data from the first collection server, the data acquisition method comprising:
- measuring an amount of gas consumption, encrypting gas consumption data obtained by the measurement and transmitting the encrypted gas consumption data to the concentrator, by the gas meter; and
- acquiring the gas consumption data extracted by the first collection server, by the second collection server.

* * * * *